US 7,961,711 B2

(12) United States Patent
Marucheck et al.

(10) Patent No.: US 7,961,711 B2
(45) Date of Patent: Jun. 14, 2011

(54) FITNESS BASED ROUTING

(75) Inventors: Michael J. Marucheck, Bellevue, WA (US); Bradford H. Lovering, Clyde Hill, WA (US); Max Attar Feingold, Bellevue, WA (US); Richard L. Hasha, Seattle, WA (US); Michael Abbott, Yarrow Point, WA (US)

(73) Assignee: Microsoft Corporation, Redmond, WA (US)

( * ) Notice: Subject to any disclaimer, the term of this patent is extended or adjusted under 35 U.S.C. 154(b) by 352 days.

(21) Appl. No.: 12/173,195

(22) Filed: Jul. 15, 2008

(65) Prior Publication Data
US 2009/0041033 A1 Feb. 12, 2009

Related U.S. Application Data

(60) Provisional application No. 60/954,201, filed on Aug. 6, 2007.

(51) Int. Cl.
*H04L 12/28* (2006.01)
*H04L 12/56* (2006.01)
(52) U.S. Cl. .................... 370/351; 370/400; 370/406
(58) Field of Classification Search .................. None
See application file for complete search history.

(56) References Cited

U.S. PATENT DOCUMENTS

| | | | |
|---|---|---|---|
| 6,415,323 B1 | 7/2002 | McCanne et al. | |
| 6,563,823 B1 * | 5/2003 | Przygienda et al. | 370/392 |
| 7,133,928 B2 | 11/2006 | McCanne | |
| 7,230,949 B2 | 6/2007 | Bharali et al. | |
| 7,257,646 B2 | 8/2007 | Jonsson | |
| 7,266,125 B2 | 9/2007 | Xu et al. | |
| 7,539,771 B2 * | 5/2009 | de Castro et al. | 709/238 |
| 2003/0236870 A1 | 12/2003 | Boivie et al. | |
| 2004/0047350 A1 | 3/2004 | Zhang et al. | |
| 2004/0054807 A1 | 3/2004 | Harvey et al. | |
| 2004/0085329 A1 | 5/2004 | Xu et al. | |
| 2004/0185845 A1 * | 9/2004 | Abhishek et al. | 455/422.1 |

(Continued)

FOREIGN PATENT DOCUMENTS
EP 1164754 6/2000
(Continued)

OTHER PUBLICATIONS

Zhi Li and Prasant Mohapatra, "QRON: QoS-Aware Routing in Overlay Networks," IEEE Journal on Selected Areas in Communications, vol. 22, No. 1, pp. 29-39, Jan. 2004.

(Continued)

*Primary Examiner* — Danniel J Ryman
*Assistant Examiner* — Michael Fialkoski
(74) *Attorney, Agent, or Firm* — Workman Nydegger

(57) ABSTRACT

The present invention extends to methods, systems, and computer program products for fitness based routing. Embodiments of the invention significantly improve the likelihood that routing nodes contained in routing table have adequate (or even relatively increased) ability to transfer and process messages in an overlay network. Thus, when the node is to make a routing decision for a message, the node has some assurances that any selected routing node is adequate (or is at least the best currently available). Further, a sending node can take preference to routing nodes with higher fitness values when sending a message. Preference to higher fitness metric values further insures that messages are adequately transferred and processed. Accordingly, embodiments of the invention can be used to route messages in a manner that optimizes bandwidth and provides efficient routing capability.

23 Claims, 6 Drawing Sheets

U.S. PATENT DOCUMENTS

| | | | |
|---|---|---|---|
| 2005/0015511 | A1 | 1/2005 | Izmailov et al. |
| 2005/0060429 | A1 | 3/2005 | Massoulie et al. |
| 2005/0083848 | A1 | 4/2005 | Shao et al. |
| 2006/0039371 | A1 | 2/2006 | Castro et al. |
| 2006/0268871 | A1 | 11/2006 | Van Zijst |
| 2007/0002869 | A1* | 1/2007 | Miller .................. 370/395.32 |
| 2007/0028002 | A1 | 2/2007 | McCanne |
| 2007/0153782 | A1 | 6/2007 | Fletcher |
| 2009/0092144 | A1* | 4/2009 | Wepiwe et al. ............ 370/406 |

FOREIGN PATENT DOCUMENTS

| | | |
|---|---|---|
| EP | 1164753 | 12/2001 |
| JP | 2006-246205 | 9/2006 |
| WO | 2007030742 | 3/2007 |
| WO | 2007034313 | 3/2007 |

OTHER PUBLICATIONS

Castro, Miguel, et al., "Peer-to-peer overlays: structured, unstructured, or both?", Technical report, 2004. Microsoft Research, Cambridge, Technical Report MSR-TR-2004-73, 15 pages.

Castro, Miguel, et al., "Performance and dependability of structured peer-to-peer overlays", Dec. 2003, 10 pages.

Chimera, copyright CURRENT Lab, U.C. Santa Barbara 2006, 1 page.

Castro, Miguel, et al., "Secure routing for structured peer-to-peer overlay networks", Appears in Proc. of the 5th Usenix Symposium on Operating Systems Design and Implementation, Boston, MA, Dec. 2002, 16 pages.

Stoica, Ion, et al., "Chord: A Scalable Peer-to-peer Lookup Service for Internet Applications", SIGCOMM'01, Aug. 27-31, 2001, San Diego, CA, Copyright 2001 ACM, 12 pages.

Prudich, Philip M., "Dynamic Routing Using an Overlay Network of Relays", Aug. 2005, 90 pages.

Bhargava, Ankur, et al., "Pagoda: A Dynamic Overlay Network for Data Management, Routing and Multicasting", 2004, 22 pages.

Zhu, Yong, "Routing, Resource Allocation and Network Design for Overlay Networks", Dec. 2006, 133 pages.

Dabek, Frank, et al. "Building peer-to-peer systems with Chord, a distributed lookup service," Proc. 8 Wshop, Hot Topics in Operating Syst., (HOTOSVIII), May 2001, 6 pages.

Rowstron, Anthony, et al. "Pastry: Scalable, distributed object location and routing for largescale peer-to-peer systems," Proc. 18th IFIP/ACM Intl. Conf. Distributed Systems Platforms (Middleware), 2001, 23 pages.

Zhao, Ben Y., et al., "Tapestry: An infrastructure for fault-tolerant wide-area location and routing," Technical Report UCB/CSD-01-1141, UC Berkeley, Apr. 2001, 27 pages.

Zhao, Ben Y., et al., "Tapestry: A Resilient Global-scale Overlay for Service Deployment," IEEE Journal on Selected Areas on Communications, vol. 22, No. 1, Jan. 2004, 15 pages.

Ratnasamy, Sylvia, et al., "A scalable content-addressable network. In SIGCOMM," Aug. 2001, pp. 161-172.

Maymounkov, Petar, et al., "Kademlia: A peer-to-peer informatic system based on the XOR metric," Proceedings of IPTPS'02, (Cambridge, MA), Mar. 2002, 35 pages.

Kubiatowicz, John, et al., "Oceanstore: An architecture for global-scale persistent storage," ASPLOS, 2000, 12 pages.

* cited by examiner

FITNESS BASED ROUTING

CROSS-REFERENCE TO RELATED APPLICATIONS

This application claims the benefit of U.S. Provisional Application No. 60/954,201, entitled "Service Bus Routing In An Overlay Network", filed on Aug. 6, 2007, which is incorporated herein in its entirety.

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic content. Accordingly, the performance of many computing tasks are distributed across a number of different computer systems and/or a number of different computing components.

An overlay network is a fabric that extends over today's traditional networks (both private networks and the internet) and provides a uniform view that masks the specifics of the underlying networks. Communication between nodes on such an overlay network consists of a message being routed by the nodes (computer systems) using specific algorithms until the intended end point is reached. Routing over overlay networks today is primarily static, that it is not inherently adaptive.

The nodes that participate in an overlay network are often treated as being homogeneous in nature as far as routing is concerned. Thus, there is a general assumption that all nodes have similar computational power, network connectivity and perceived load. This assumption is valid at least in some environments, such as, for example, where the nodes are in a controlled datacenter type environment with consistent loads. However, in many other environments this assumption is not valid. For example, nodes on the Internet or other distributed computing environments have heterogeneous varying configurations load, and computation capacity.

Further, network link capacities between nodes on the Internet and other distributed networks vary from broadband to dialup speeds. For example, assuming there are two potential routes to get from point A to point B. One route involves going through a node that is connected by a dialup and another route involves going through a node that is connected by a high speed broadband connection. If all nodes were to be treated alike, probabilistically, messages can be routed through the node connected by dial-up, which is a sub-optimal route and affects the efficiency of message transfer. These, as well as other, inefficiencies can be magnified using overlay networks that are large scale (e.g., millions of nodes) and have high capacity machines and links that can be effectively utilized.

At least one other problem with overlay networks is the mechanism that is used to update presence information between nodes (i.e., when one node knows of the presence of another node). Typical mechanisms for propagating presence information include flooding the overlay or, at least a large portion of the overlay, with the node's presence information. The presence information is picked up by members of the overlay and stored as part of their routing table and used for subsequent routing decisions. However, flooding presence information onto the overlay is very expensive and consumes significant network capacity. The consumed network capacity is then unavailable for actual application messages. The problem is potentially significantly exacerbated as the number of nodes on an overlay network increases, such as, for example, when there are thousands or even millions of nodes publishing presence information.

There are also other problems associated with overlay networks. For example, using an overlay network it is often beneficial to communicate between two arbitrary nodes on the overlay. In order to do that, the source node needs the end point address (IP address/DNS name) of the destination. Overlay networks employ a decentralized mechanism for routing messages across the overlay, wherein each node has a partial knowledge of the location of other nodes in the overlay. Messages are passed across the overlay from the source to a node that is "closer" to the destination and with each hop gets numerically closer to the destination, until the destination node is reached. The use of "closeness" as a sole factor in considering a route between nodes can often cause less efficient routes between nodes.

BRIEF SUMMARY

The present invention extends to methods, systems, and computer program products for fitness based routing. Embodiments of the invention include maintaining a routing table at a computer system, such as, for example, a node in an overlay network. The computer system receives node information for another node that exists at a specified location within the overlay network. The node information includes fitness information for the other node.

The computer system accesses a routing table that includes one or more nodes, each node in the routing table being a node that the computer system can send a message to deliver the message to a destination node within the overlay network. Each node in the routing table has a fitness metric value representing an ability of the node to transfer and process messages within the overlay network. The computer system calculates a fitness metric value for the other node. The calculated fitness metric value represents the other node's ability to transfer and process messages within the overlay network. The fitness metric value based at least in part on the fitness information for the other node.

The computer system inserts the other node into the routing table. The routing table is divided into a plurality of ranges. Each range corresponds to a portion of the overlay network. The computer system assigns each node in the routing table a specified range based on the location of the node in the overlay network.

The computer identifies the range that includes the most nodes. The computer system identifies the node within the identified range that is least able to transfer and process messages within the overly network based on fitness metric values of the nodes in the identified range. The computer system removes the identified node from the routing table.

In some embodiments, node information for a plurality of nodes in an overlay network is received in a message from another node in the overlay network. A fitness metric is calculated for each of the plurality of nodes and each of the other nodes is inserted in the computer system's routing table. It is determined that the number of nodes in the routing table exceeds a specified number.

The routing table is divided into a plurality of ranges, each range corresponding to a portion of the overlay network. Each of the nodes in the routing table is assigned to one of the plurality of ranges. The range with the most nodes is identified. From among the nodes in the identified range, the node least fit to transfer and process messages, based on fitness metric values, is removed from the routing table. Identification of the range with the most nodes and removal of least fit nodes from within that range can continue until the number of nodes in the routing table no longer exceeds the specified number.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1A:
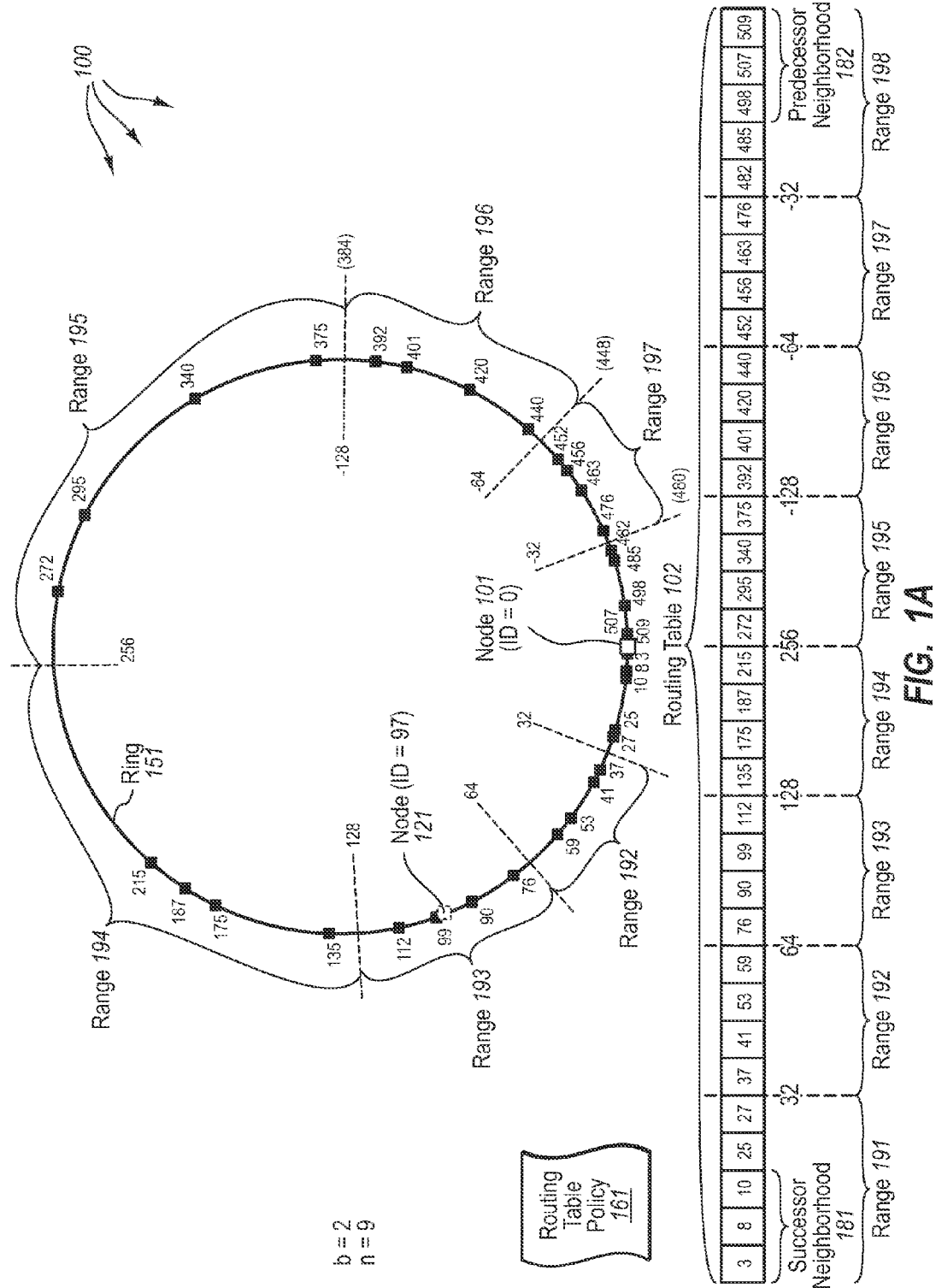
FIG. 1A illustrates a view of an example overlay ring network architecture that facilitates fitness based routing.

The present invention extends to methods, systems, and computer program products for fitness based routing. Embodiments of the invention include maintaining a routing table at a computer system, such as, for example, a node in an overlay network. The computer system receives node information for another node that exists at a specified location within the overlay network. The node information includes fitness information for the other node.

The computer system accesses a routing table that includes one or more nodes, each node in the routing table being a node that the computer system can send a message to to delivery the message to a destination node within the overlay network. Each node in the routing table has a fitness metric value representing an ability of the node to transfer and process messages within the overlay network. The computer system calculates a fitness metric value for the other node. The calculated fitness metric value represents the other node's ability to transfer and process messages within the overlay network. The fitness metric value is based at least in part on the fitness information for the other node.

The computer system inserts the other node into the routing table. The routing table is divided into a plurality of ranges. Each range corresponds to a portion of the overlay network. The computer system assigns each node in the routing table a specified range based on the location of the node in the overlay network.

The computer identifies the range that includes the most nodes. The computer system identifies the node within the identified range that is least able to transfer and process messages within the overly network based on fitness metric values of the nodes in the identified range. The computer system removes the identified node form the routing table.

In some embodiments, node information for a plurality of nodes in an overlay network is received in a message from another node in the overlay network. A fitness metric is calculated for each of the plurality of nodes and each of the other nodes is inserted in the computer system's routing table. It is determined that the number of nodes in the routing table exceeds a specified number.

The routing table is divided into a plurality of ranges, each range corresponding to a portion of the overlay network. Each of the nodes in the routing table is assigned to one of the plurality of ranges. The range with the most nodes is identified. From among the nodes in the identified range, the node least fit to transfer and process messages, based on fitness metric values, is removed from the routing table. Identification of the range with the most nodes and removal of least fit nodes from within that range can continue until the number of nodes in the routing table no longer exceeds the specified number.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical storage media and transmission media.

Physical storage medium includes RAM, ROM, EEPROM, CD-ROM or other optical disk storage, magnetic disk storage or other magnetic storage devices, or any other physical medium which can be used to store desired program code means in the form of computer-executable instructions or data structures and which can be accessed by a general purpose or special purpose computer.

With this description and following claims, a "physical network" is defined as one or more data links that enable the transport of electronic data between computer systems and/or modules and/or other electronic devices.

Within this description and in the following claims, an "overlay network" is defined as a computer network that is built on top of another network (e.g., a physical network or another overlay network). Nodes on an overlay network can be viewed as being connected by virtual or logical links, each of which corresponds to a path, perhaps through many physical networks and/or data links, in an underlying network. For example, many peer-to-peer networks are overlay networks because they run on top of the Internet. Overlay networks can be constructed in order to permit routing messages to destinations not specified by an IP address. For example, distributed hash tables can be used to route messages to a node having specific logical address, whose IP address is not known in advance.

When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, it should be understood, that upon reaching various computer system components, program code means in the form of computer-executable instructions or data structures can be transferred automatically from transmission media to physical storage media (or vice versa). For example, computer-executable instructions or data structures received over a network or data link can be buffered in RAM within a network interface module (e.g., a "NIC"), and then eventually transferred to computer system RAM and/or to less volatile physical storage media at a computer system. Thus, it should be understood that physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1A illustrates a view of network architecture 100 that facilitates fitness based routing. As depicted in FIG. 1A, network architecture 100 includes ring 151. Ring 151 is a bi-directional doubly linked list of $2^9$, or 512, locations that may be occupied by a node, providing a doubly linked ring topology (i.e., an overlay network). Ring 151 includes a plurality of nodes including node 101 and other nodes listed by ID number in routing table 102. Generally, ring 151 represents logical connectively between nodes that may be physically connected over various and different underlying networks and connections. For example, each of the nodes can be physically connected to one another over a system bus and/or over (or be part of) one or more underlying networks, such as, for example, a Local Area Network ("LAN"), a Wide Area Network ("WAN"), and even the Internet.

Nodes on ring 151 can use various overlay protocols to communicate with another. Overlay protocols can build and/or be based on protocols of the underlying physical networks. Thus, each of the depicted nodes as well as any other connected nodes, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the underlying networks.

Node 101 maintains routing table 102 that stores a plurality of nodes (hereinafter referred to as "routing nodes"). Node 101 can communicate directly with each of the routing nodes in routing table 102. Node 101 can send a message to a routing node to deliver the message to a node that is closer to the routing node than node 101. For example, to deliver a message to the node having ID=403, node 101 can send the message to the routing node having ID=401

Node 101 can maintain a routing table 102 in accordance with routing table policy 161. Routing table policy 161 can define a maximum number of routing nodes that are to be included in routing table 102. Routing table policy 161 can also indicate how to divide nodes within routing table 102 into a number of ranges and define a maximum number of routing nodes per range. For example, routing table policy 161 can dictate that routing table 102 can be divided into ranges 191, 192, 193, 194, 195, 196, 197 and 198.

The range IDs included in a range can be varied such that ranges closer to node 101 are more densely populated with routing nodes and ranges further from node 101 are less densely populated with routing nodes. For example, range 192 includes four routing nodes in a range from +32 IDs to +64 IDs from node 101. Range 194 includes four routing nodes in a range from +128 to +246. Thus, both range 192 and 194 include four routing nodes. However, range 192 is more densely populated since the four routing nodes in range 192 are spread over a smaller distance on ring 151. On the other hand, range 194 is less densely populated since the four routing nodes in range 192 are spread over a greater distance on ring 151.

Routing table policy 161 can also define a range for nearby neighborhood nodes. For example, nodes within +16 to −16 node IDs from node 101 can automatically be included in routing table 102 as neighborhood nodes. Neighborhood nodes can be split between predecessor and successor neighborhoods. For example, routing table 102 includes successor neighborhood 181 and predecessor neighborhood 182 each having three nodes relatively close to (within 16 node IDs of) node 101.

Figure 1B:
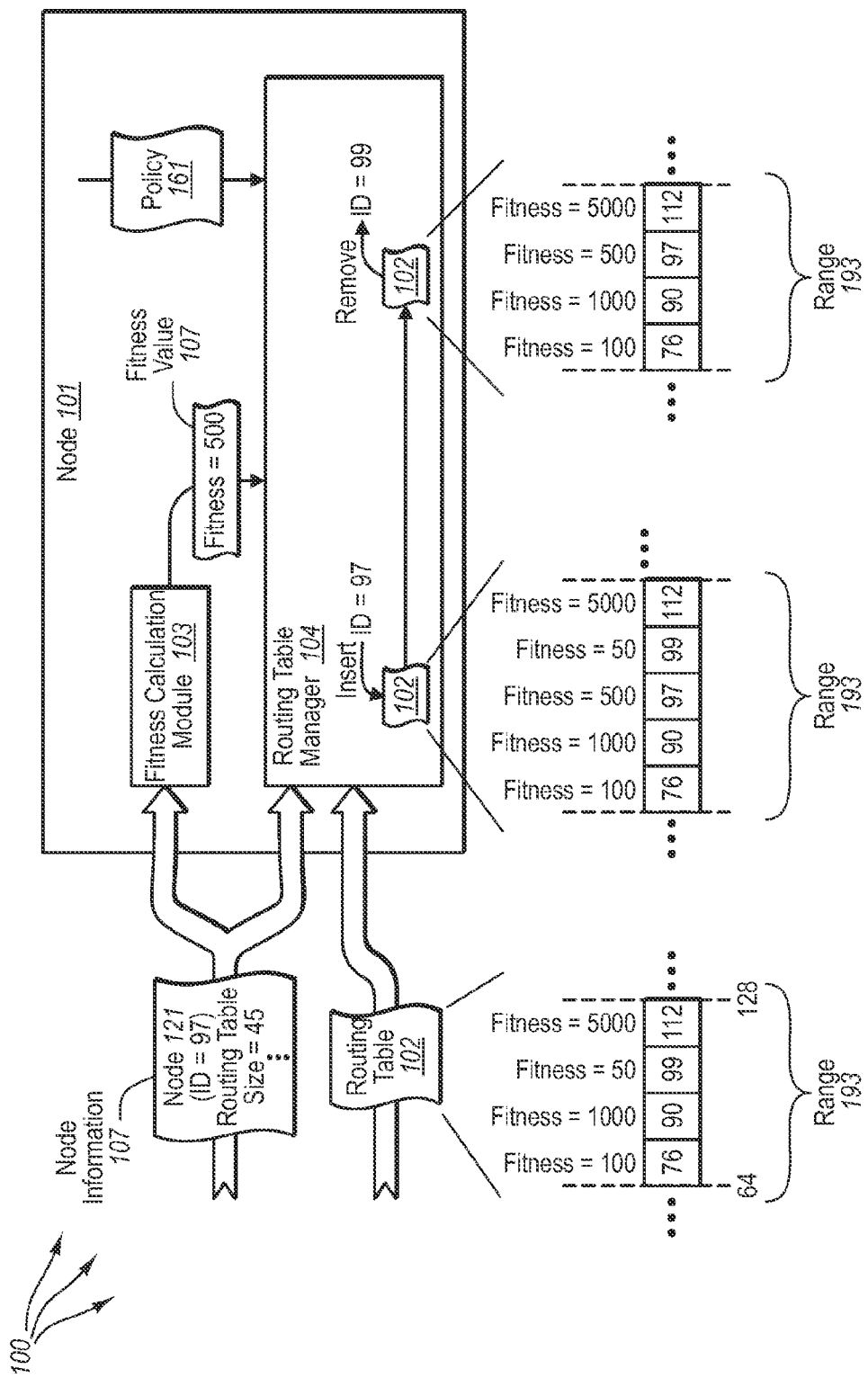
FIG. 1B illustrates a view of an example node of the overlay ring network architecture maintaining a routing table.

FIG. 1B illustrates a view of node 101 maintaining routing table 102. Referring now to FIG. 1B, node 101 includes fitness calculation module 103 and routing table manager 104. Fitness calculation module 103 is configured to calculate fitness values for routing nodes. Fitness calculation module 103 can implement a fitness calculation algorithm to calculate fitness values for routing nodes. Generally, a fitness value indicates a routing node's ability to process and route messages.

A fitness value can be calculated from a variety of different types of data that indicate, at least to some extent, a node's ability to process and route messages. For example, a fitness value can be calculated from one or more of: routing table size of the routing node, latency between node 101 and the routing node, the number of messages that a routing node sends, and the number of messages that a routing node receives. Different types of data can be weighted differently when calculating a fitness value. In some embodiments, a single type of data, such as, for example, routing table size, is used to calculate a fitness value.

Routing table manager 104 is configured to put nodes into and remove nodes from routing table 102 in accordance with a routing table policy 161. Routing table manager 104 can also compare fitness values between routing nodes to determine what routing nodes to keep and what routing nodes remove.

From time to time, node 101 communicates with nodes on ring 151. During this communication, the nodes can include node information about themselves as well as other nodes on ring 151. The node information can include routing table sizes of other nodes, latency between node 101 and a node, the number of messages that a node has sent, and the number of messages a node has received. Based on received node information, fitness calculation module can calculate a fitness value for one or more nodes.

Some of the nodes can be retained in routing table 102 along with their corresponding fitness values. For example, within range 193: node ID 76 has fitness=100, node ID 90 has fitness=1000, node ID 99 has fitness=50, and node ID 112 has fitness=5000. Routing table manager 104 can permit the routing table 102 and its various ranges to fill up with routing nodes to specified maximum values. After reaching specified maximum values, routing table manager 104 can interoperate with fitness calculation module 103 to maintain the size of routing table 102 and its various ranges at the specified maximum values.

Figure 2:
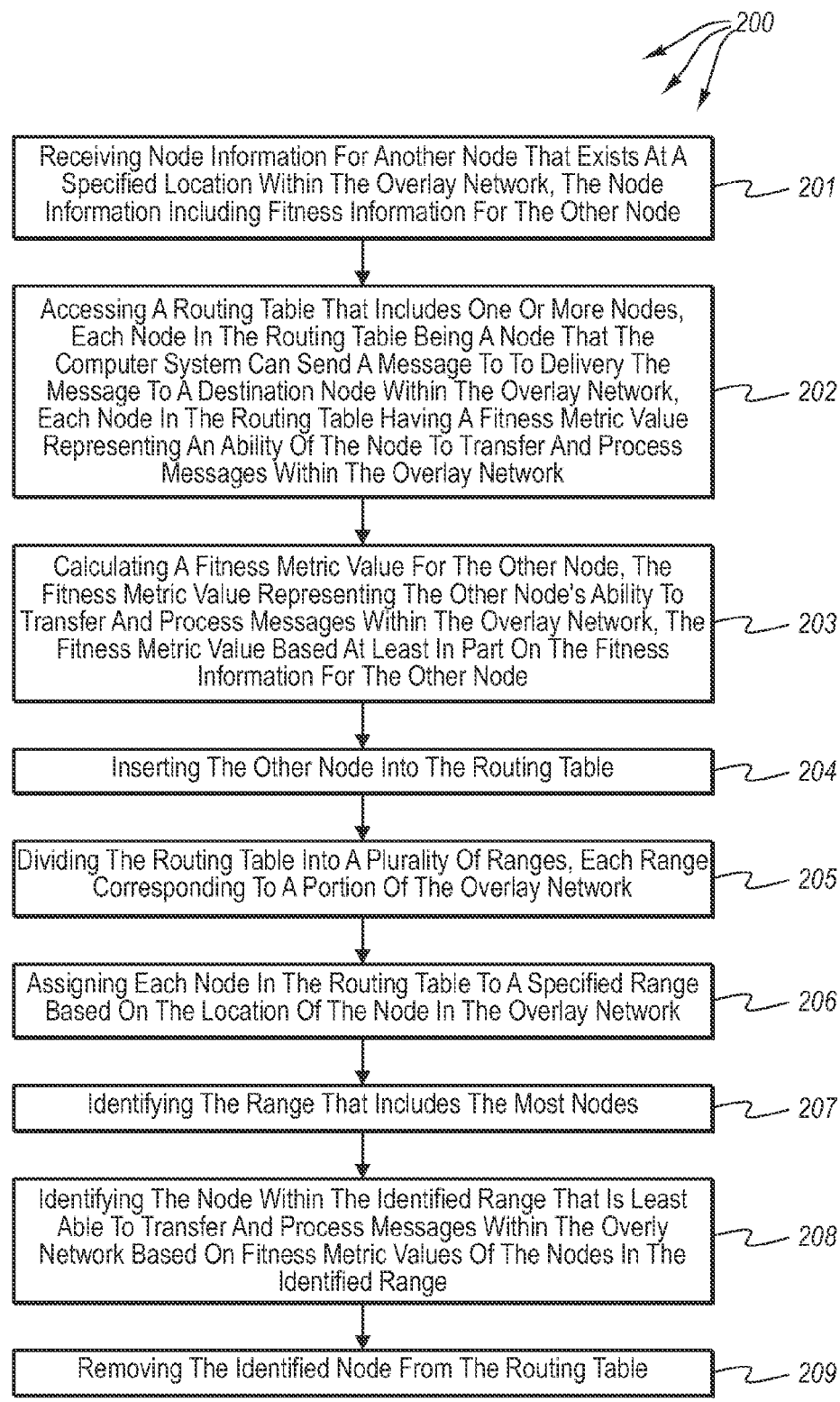
FIG. 2 illustrates a flow chart of an example method for maintaining a routing table.

FIG. 2 illustrates a flow chart of method 200 for maintaining a routing table. Method 200 will be described with respect to the components and data in FIGS. 1A and 1B.

Method 200 includes an act of receiving node information for another node that exists at a specified location within the overlay network, the node information including fitness information for the other node (act 201). For example, node 101 can receive node information 107. Node information 107 includes characteristics about node 121. For example, node information 107 indicates that node 121 has routing table size of 45. That is, the routing table of node 121 includes 45 routing nodes.

Method 200 includes an act of accessing a routing table that includes one or more nodes, each node in the routing table being a node that the computer system can send a message to to delivery the message to a destination node within the overlay network, each node in the routing table having a fitness metric value representing an ability of the node to transfer and process messages within the overlay network (act 202). For example, routing table manager 104 can access routing table 102. Each node in routing table 102 is a routing node that node 101 can send a message to to delivery the message to a destination node (on ring 151). Each routing node in routing table 102 also has a fitness value. For example, within range 193: node ID 76 has fitness=100, node ID 90 has fitness=1000, node ID 99 has fitness=50, and node ID 112 has fitness=5000.

Prior to accessing routing table 102, routing table manager 104 can lock routing table 102. Locking routing table 102 prevents other access to routing table 102 (e.g., routing determinations). Thus, locking mitigates the potential for routing errors due to accessing routing table 102 when routing table 102 is being altered.

Method 200 includes an act of calculating a fitness metric value for the other node, the fitness metric value representing the other node's ability to transfer and process messages within the overlay network, the fitness metric value based at least in part on the fitness information for the other node (act 203). For example, fitness calculation module 103 can calculate fitness value 107 for node 121 based at least in part on node information 107. Fitness value 107 can be calculated based on one or more characteristics of node 121, including routing table size. Fitness metric value 107 indicates the ability of node 121 to transfer and process messages within ring 151.

Method 200 includes an act of inserting the other node into the routing table (act 204). For example, routing table manager 104 can insert node ID 97 into routing table 102. Method 200 includes an act of dividing the routing table into a plurality of ranges, each range corresponding to a portion of the overlay network (act 205). For example, routing table manager 104 can divide routing table 102 into ranges 191-198.

Method 200 includes an act of assigning each node in the routing table to a specified range based on the location of the node in the overlay network (act 206). For example, routing table manager can assign each routing node of routing table 102 to a specified range, selected from among ranges 191-198, based on the location of the routing node within ring 151. Routing table 102 can be divided and routing nodes assigned to ranges as depicted in FIG. 1. Additionally, node 121 can be assigned to range 193 as depicted in FIG. 1B.

Method 200 includes an act of identifying the range that includes the most nodes (act 207). For example, routing table manager 104 can identify that range 193 includes the most nodes. Range 193 includes five nodes, while ranges 192, and 194-197 include four nodes (neighborhood nodes can be excluded from the identification).

Method 200 includes an act of identifying the node within the identified range that is least able to transfer and process messages within the overly network based on fitness metric values of the nodes in the identified range (act 208). For example, routing tale manager 104 can identify node ID 99 as having the lowest fitness metric value in range 193. Within computer architecture 100, a lower fitness metric value can indicate a lesser ability to transfer and process messages. Accordingly, routing table manager 104 can identify node ID 99 as the routing node least able to transfer and process messages within ring 151. (However, depending on configuration, a higher fitness metric value, or some other mechanism for determining messaging processing and transfer abilities from fitness metric values, can be used to indicate a lesser ability to transfer and process messages).

Method 200 includes an act of removing the identified node from the routing table (act 209). For example, routing table manager 104 can remove node ID 99 from routing table 102. Subsequent, to removing node ID 99, routing table manager 104 can unlock routing table 102. Unlocking routing table 102 permits other access to routing table 102. Thus, node 101 can used routing table 102 to identify routing nodes after any alteration is complete.

Figure 1C:
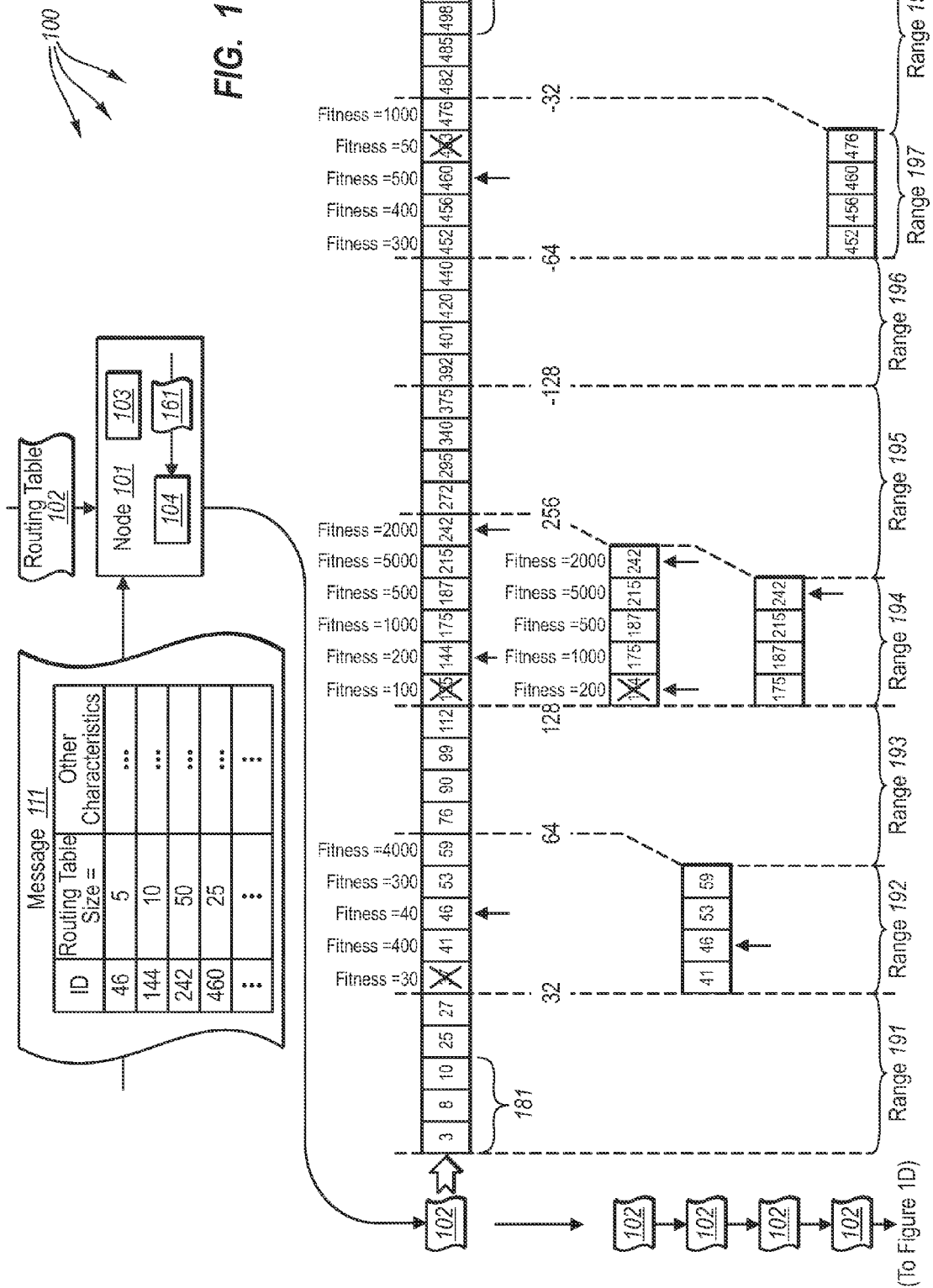
FIGS. 1C and 1D illustrates another view of the example node of the overlay ring network architecture maintaining a routing table.
Figure 1D:
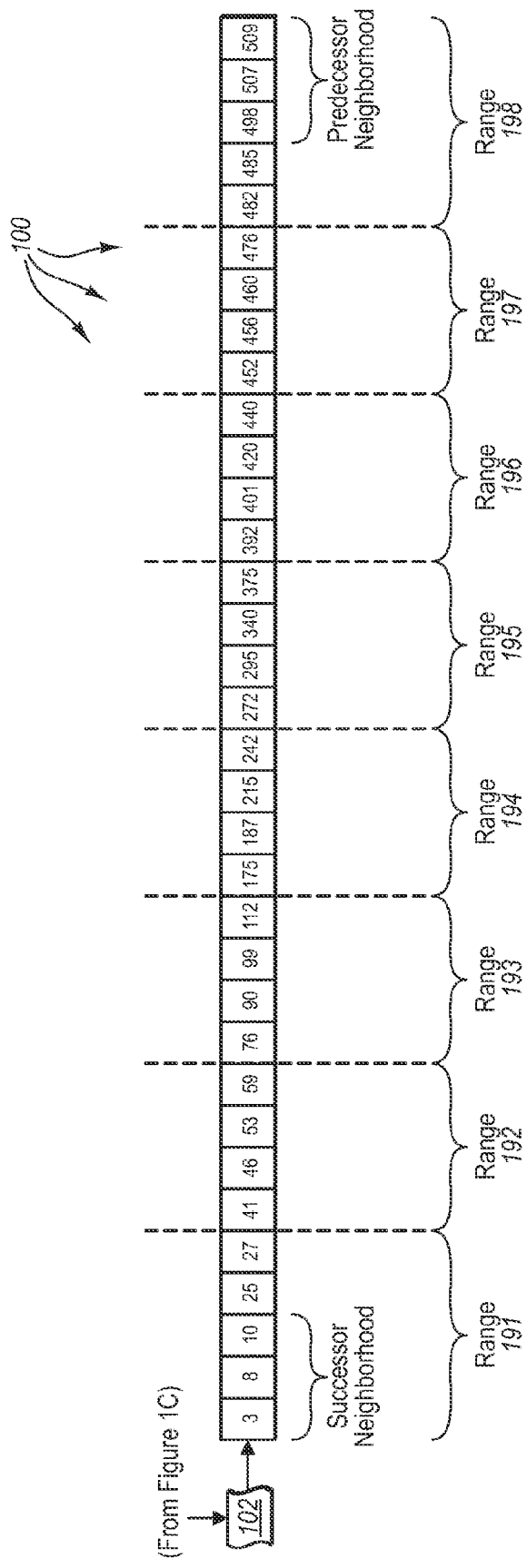
Figure 3:
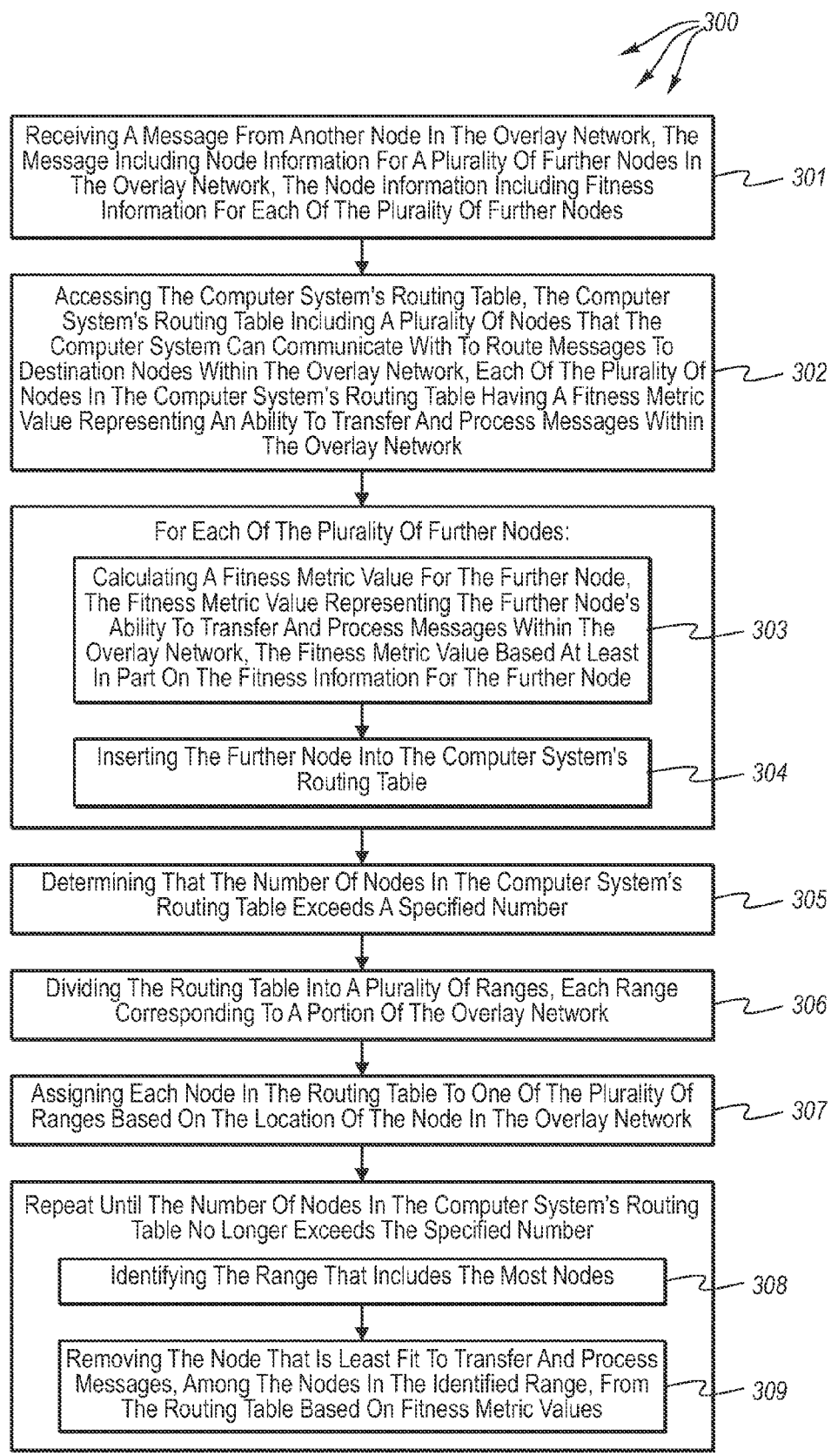
FIG. 3 illustrates a flow chart of another example method for maintaining a routing table.

In some embodiments, a node receives a message that includes node information for a plurality of other nodes. FIGS. 1C and 1D illustrates another view of node 101 maintaining a routing table when node information for a plurality of nodes is received. FIG. 3 illustrates a flow chart of a method 300 for maintaining a routing table. Method 300 will be described with respect to the components and data in FIGS. 1C and 1D.

Method 300 includes an act of receiving a message from another node in the overlay network, the message including node information for a plurality of further nodes in the overlay network, the node information including fitness information for each of the plurality of further nodes (act 301). For example, node 101 can receive message 111 from another node on ring 151. Message 111 includes node information for a plurality of other nodes on ring 151, including fitness information for each of the plurality of nodes. For example, message 111 includes routing table size and other characteristics (e.g., number of sent messages, number of received messages, etc.) for node IDs 46, 144, 242, and 460. The contents of message 111 can represent the other node's routing table or a portion thereof.

Method 300 includes an act of accessing the computer system's routing table, the computer system's routing table including a plurality of nodes that the computer system can communicate with to route messages to destination nodes within the overlay network, each of the plurality of nodes in the computer system's routing table having a fitness metric value representing an ability to transfer and process messages within the overlay network (act 302). For example, routing table manager 104 can access routing table 102. Each routing node in routing table 102 has a fitness metric value represent the ability of the routing node to transfer and process messages within ring 151.

Prior to accessing routing table 102, routing table manager 104 can lock routing table 102. Locking routing table 102 prevents other access to routing table 102 (e.g., routing determinations). Thus, locking mitigates the potential for routing errors due to accessing routing table 102 when routing table 102 is being altered.

For each of the plurality of further nodes, method 300 includes an act of calculating a fitness metric value for the further node, the fitness metric value representing the further node's ability to transfer and process messages within the overlay network, the fitness metric value based at least in part on the fitness information for the further node (act 303). For example, fitness calculation module 103 can calculate fitness metric values 40, 200, 2000, and 500 for node IDs 46, 144, 242, and 460 respectively. Fitness metric values can be calculated based on routing table sizes and/or other characteristics indicated in message 111.

For each of the plurality of further nodes, method 300 includes an act of inserting the further node into the computer system's routing table (act 304). For example, routing table manager 104 can insert node IDs 46, 144, 242, and 460 into routing table 102.

Method 300 includes an act of determining that the number of nodes in the computer system's routing table exceeds a specified number (act 305). For example, routing table manager 104 can refer to routing table policy 161 to access a maximum routing node count for routing tables 102. Routing table manger 104 can determine that the insertion of node IDs 46, 144, 242, and 460 has caused the number of nodes in routing table 102 to exceed the maximum routing node count.

Method 300 includes an act of dividing the routing table into a plurality of ranges, each range corresponding to a portion of the overlay network (act 306). For example, routing node manager 104 can divide routing table 102 into ranges 191-198. Method 300 includes an act of assigning each node in the routing table to one of the plurality of ranges based on the location of the node in the overlay network (act 307). For example, each of the nodes in routing table 102 can be assigned to one of the ranges 191-198 based on their location in ring 151. Node ID 46 can be assigned to range 193, node IDs 144 and 242 can be assigned to range 195, and node ID 460 can assigned to range 197.

Method 300 includes an act of identifying the range with the most nodes (act 308). For example, routing table manager can identify range 194 as including the most (six) routing nodes. Method 300 includes removing the node that is least fit to transfer and process messages, among the nodes in the identified range, from the routing table based on fitness metric values (act 309). For example, routing table manager 102 can remove node ID 135 from routing table 102. Routing table manager 104 can identify node ID 135 as having the lowest fitness metric value in range 193. Accordingly, routing table manager 104 determines that node ID 135 is the routing node least able to transfer and process messages within ring 151. (However, as previously described depending on configuration, a higher fitness metric value, or some other mechanism for determining messaging processing and transfer abilities from fitness metric values, can be used to indicate a lesser ability to transfer and process messages).

In some embodiments, acts 308 and 309 can be repeated until the number of nodes routing table 102 no longer exceeds the specified number. For example, after the removal of a node, routing table manager 104 can again check the number of nodes in routing table 102 to the maximum routing node count. If the number of routing nodes in routing table 102 still exceeds the maximum routing node count, acts 308 and 309 can be repeated.

For example, after removal of node ID 135, routing table manager 104 can determine that range 192 includes five nodes. Routing tale manager 104 can identify node ID 37 the routing node least able to transfer and process messages within ring 151 based on fitness metric values. Accordingly, routing table manager 104 removes node ID 37 from routing table 102. Subsequent similar checks can be performed resulting in the removal of node ID 144 (in range 193) and node ID 463 (in range 197). Thus, routing table 102 is eventually returned to the size before message 111 was received. FIG. 1D shows the resulting contents of routing table 102 subsequent to processing message 111.

Subsequent to updating routing table 102, routing table manager 104 can unlock routing table 102. Unlocking routing table 102 permits other access to routing table 102. Thus, node 101 can used routing table 102 to identify routing nodes after any alteration is complete. As such, subsequent to processing message 111, node 101 can send a message towards a destination node in ring 151. Based on the location of the destination node, node 101 can select a routing node (from routing table 102) in closer proximity to the destination node and send the message to the proximally closer routing node.

Embodiments of the invention significantly improve the likelihood that routing nodes contained in routing table have adequate (or even relatively increased) ability to transfer and process messages in an overlay network. Thus, when the node is to make a routing decision for a message, the node has some assurances that any selected routing node is adequate (or is at least the best currently available). Further, a sending node can take preference to routing nodes with higher fitness metric values when sending a message. Preference to higher fitness metric values further insures that messages are adequately transferred and processed. Accordingly, embodiments of the invention can be used to route messages in a manner that optimizes bandwidth and provides efficient routing capability.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. At a computer system which represents a node in an overlay network, the overlay network also including a plurality of other computer systems representing other nodes, a method for maintaining a routing tables at each of the computer systems of the nodes of the overlay network so that routing information from one node to another can be more efficiently determined using the routing tables, the method comprising:

at the computing system of one or more nodes of the overlay network, performing the following:

at a first node of the overlay network, performing an act of receiving node information for another node that exists at a specified location within the overlay network, the node information including fitness information for the other node;

at the first node of the overlay network, performing an act of accessing a routing table that includes one or more nodes, each node in the routing table being a node to which the computer system of the first node can send a message that is then forwarded by that node for delivery to a destination node within the overlay network, each node in the routing table having a fitness metric value representing an ability of the node to transfer and process messages within the overlay network;

at the first node, performing an act of calculating a fitness metric value for the other node, the fitness metric value representing the other node's ability to transfer and process messages within the overlay network, the fitness metric value based on one or more characteristics used to determine the fitness information for the other node;

an act of inserting the other node into the routing table of the first node;

an act of dividing the first node's routing table into a plurality of ranges, each range corresponding to a portion of the overlay network;

an act of assigning each node in the first node's routing table to a specified range based on the location of each of the assigned nodes in the overlay network; and an act of maintaining the size of the first node's routing table so that the routing table does not exceed a specified size when adding other nodes to it, by performing the following:

an act of identifying in the first node's routing table a range that is as large or larger than any other range in the routing table in terms of the number of nodes included in the identified range;

an act of identifying a node within the identified range that has the lowest fitness value and as such is least able to transfer and process messages within the overlay network based on fitness metric values of the nodes in the identified range; and an act of removing the identified node from the routing table of the first node.

2. The method as recited in claim 1, wherein the act of receiving node information for another node comprises an act of receiving a routing table size for the other node along with one or more other characteristics of the other node.

3. The method as recited in claim 1, wherein the act of accessing a routing table comprises an act of accessing a routing table containing nodes that can be used to route a message in a ring topology.

4. The method as recited in claim 1, wherein the act of calculating a fitness metric value for the other node comprises an act of calculating a fitness metric value based on routing table size of the other node.

5. The method as recited in claim 1, wherein each node in the overlay network is assigned a unique identifier, and wherein the act of dividing the routing table into a plurality of ranges comprises an act of dividing the routing table in ranges, each range corresponding to a smaller or larger portion of the overlay network depending on the distance of the range from the computer system, wherein ranges that encompass nodes with unique identifiers that are closer to the node's identifier encompass fewer nodes than ranges that encompass nodes with unique identifiers that are closer to the node's identifier.

6. The method as recited in claim 1, wherein an act of identifying the node within the identified range that is least able to transfer and process messages within the overlay network comprises an act of identifying the node with the smallest routing table.

7. The method as recited in claim 1, wherein the act of removing the identified node from the routing table comprises an act of removing the node having the smallest routing table from the computer system's routing table.

8. The method as recited in claim 1, further comprising:
an act of locking the routing table prior to accessing the routing table; and
an act of unlocking the routing table subsequent to removing the identified node.

9. The method as recited in claim 1, further comprising:
an act of selecting a routing node from the routing table subsequent to removing the identified node; and
an act of sending a message to the selected routing node.

10. At a computer system which represents a node in an overlay network, the overlay network also including a plurality of other computer systems representing other nodes, a method for maintaining routing tables at each of the computer systems of the nodes of the overlay network so that routing information from one node to another can be more efficiently determined using the routing tables, the method comprising:

at the computing system of one or more nodes of the overlay network, performing the following:

at a first node of the overlay network, performing an act of receiving a message from another node in the overlay network, the message including node information for a plurality of further nodes in the overlay network, the node information including fitness information for each of the plurality of further nodes;

at the first node of the overlay network, performing an act of accessing the computer system's routing table, the computer system's routing table including a plurality of nodes that the computer system can communicate with to route messages to destination nodes within the overlay network, each of the plurality of nodes in the computer system's routing table having a fitness metric value representing an ability to transfer and process messages within the overlay network;

at the first node, for each of the plurality of further nodes:
using a fitness calculation module to perform an act of calculating a fitness metric value for the further node, the fitness metric value representing the further node's ability to transfer and process messages within the overlay network, the fitness metric value based at least in part on the fitness information for the further node; and using a routing table manager to perform an act of inserting the further node into the computer system's routing table;

at the first node, performing an act of determining in accordance with a routing policy that the number of nodes in the computer system's routing table exceeds a specified number;

an act of dividing the first node's routing table into a plurality of ranges, each range corresponding to a portion of the overlay network;

an act of assigning each node in the first node's routing table to one of the plurality of ranges based on the location of the node in the overlay network;

an act of reducing the size of the first node's routing table to the specified number of nodes in accordance with the routing policy, by performing the following:

an act of identifying in the first node's routing table a range that is as large or larger than any other range in the routing table in terms of the number of nodes included in the identified range; and an act of removing the node that has the lowest fitness value and as such is least fit to transfer and process messages, among the nodes in the identified range, from the first node's routing table.

11. The method as recited in claim 10, wherein the act of receiving a message from another node in the overlay network comprises an act of receiving a message that includes routing table size for each of the plurality of further nodes along with one or more other characteristics for each of the plurality of further nodes.

12. The method as recited in claim 10, wherein the act of calculating a fitness metric value for the further node comprises an act of calculating a fitness metric value based on routing table size of the further node.

13. The method as recited in claim 10, wherein the act of calculating a fitness metric value for the further node comprises an act of calculating a fitness metric value based solely on routing table size of the further node.

14. The method as recited in claim 10, wherein the act of determining that the number of nodes in the computer system's routing table exceeds a specified number comprises an act of referring to a routing table policy.

15. The method as recited in claim 10, further comprising subsequent to removing the node that is least fit to transfer and process messages from among the nodes in the identified range:

repeating the following acts until the number of nodes in the computer system's routing table no longer exceeds the specified number:

an act of identifying a next range that includes more nodes, or at least as many nodes, as any other range in the routing table; and an act of removing the node that is least fit to transfer and process messages, among the nodes in the next identified range, from the routing table, based on fitness metric values.

16. The method as recited in claim 10, further comprising:
an act of locking the routing table prior to accessing the routing table; and
an act of unlocking the routing table subsequent to removing the identified node.

17. The method as recited in claim 10, further comprising:
an act of selecting a routing node from the routing table subsequent to removing the identified node; and
an act of sending a message to the selected routing node.

18. The method as recited in claim 10, wherein the overlay network is a ring topology.

19. The method as recited in claim 10, wherein the overlay network is a peer-to-peer network overlaid on the Internet.

20. At a computer system which represents a node in an overlay network having a doubly linked ring topology, the overlay network also including a plurality of other computer systems representing other nodes, a method for maintaining routing tables at each of the computer systems of the nodes of the overlay network so that routing information from one node to another can be more efficiently determined using the routing tables, the method comprising:

at the computing system of one or more nodes of the overlay network, performing the following:

at a first node of the overlay network, performing an act of receiving a message from another node in the doubly linked ring topology, the message including node information for a plurality of further nodes in the other node's routing table, the received node information indicating routing table size for each further node in the other node's routing table;

at the first node, performing an act of locking the computer system's routing table to prevent any routing determinations subsequent to receiving the message, each node in the computer system's routing table being a node to which the computer system of the first node can send messages that are then forwarded by that node for delivery to a destination node within the doubly linked ring topology, each of the plurality of nodes in the computer system's routing table stored along with an indication of a corresponding routing table size of the node;

at the first node, performing an act of integrating the plurality of further nodes into the computer system's routing table;

at the first node, performing an act of determining that the number of nodes in the computer system's routing table exceeds a specified number based on a routing table policy;

at the first node, performing an act of dividing the routing table into a plurality of ranges, each range corresponding to a portion of the doubly linked ring topology;

at the first node, performing an act of assigning each node in the routing table to one of the plurality of ranges based on the location of the node in the doubly linked ring topology;

repeating the following acts at the first node until the number of nodes in the computer system's routing table no longer exceeds the specified number:

an act of identifying in the first node's routing table a range that is as large or larger than any other range in the routing table in terms of the number of nodes included in the identified range;

an act of identifying a node within the identified range that has the smallest indicated routing table size; and an act of removing the identified node from the computer system's routing table; and at the first node, performing an act of unlocking the computer system's routing table so that the computer system's routing table can again be used in routing determinations subsequent to the number of nodes in the computer system's routing table no longer exceeding the specified number.

21. At a computer system which represents a node in an overlay network, the overlay network also including a plurality of other computer systems representing other nodes, a computer program product comprised of computer-readable physical storage media, which, when implemented on a computer system of one of the nodes performs a method for maintaining routing tables at each of the computer systems of the nodes of the overlay network so that routing information from one node to another can be more efficiently determined using the routing tables, the method comprising:

at the computing system of one or more nodes of the overlay network, performing the following:
at a first node of the overlay network, performing an act of receiving node information for another node that exists at a specified location within the overlay network, the node information including fitness information for the other node;
at the first node of the overlay network, performing an act of accessing a routing table that includes one or more nodes, each node in the routing table being a node to which the computer system of the first node can send a message that is then forwarded by that node for delivery to a destination node within the overlay network, each node in the routing table having a fitness metric value representing an ability of the node to transfer and process messages within the overlay network;
at the first node, performing an act of calculating a fitness metric value for the other node, the fitness metric value representing the other node's ability to transfer and process messages within the overlay network, the fitness metric value based on one or more characteristics used to determine the fitness information for the other node;
an act of inserting the other node into the routing table of the first node;
an act of dividing the first node's routing table into a plurality of ranges, each range corresponding to a portion of the overlay network;
an act of assigning each node in the first node's routing table to a specified range based on the location of the each of the assigned nodes in the overlay network; and
an act of maintaining the size of the first node's routing table so that the routing table does not exceed a specified size when adding other nodes to it, by performing the following:
an act of identifying in the first node's routing table a range that is as large or larger than any other range in the routing table in terms of the number of nodes included in the identified range;
an act of identifying a node within the identified range that has the lowest fitness value and as such is least able to transfer and process messages within the overlay network based on fitness metric values of the nodes in the identified range; and
an act of removing the identified node from the routing table of the first node.

22. At a computer system which represents a node in an overlay network, the overlay network also including a plurality of other computer systems representing other nodes, a computer program product comprised of computer-readable physical storage media, which, when implemented on a computer system of one of the nodes performs a method for maintaining routing tables at each of the computer systems of the nodes of the overlay network so that routing information from one node to another can be more efficiently determined using the routing tables, the method comprising:

at the computing system of one or more nodes of the overlay network, performing the following:
at a first node of the overlay network, performing an act of receiving a message from another node in the overlay network, the message including node information for a plurality of further nodes in the overlay network, the node information including fitness information for each of the plurality of further nodes;
at the first node of the overlay network, performing an act of accessing the computer system's routing table, the computer system's routing table including a plurality of nodes that the computer system can communicate with to route messages to destination nodes within the overlay network, each of the plurality of nodes in the computer system's routing table having a fitness metric value representing an ability to transfer and process messages within the overlay network;
at the first node, for each of the plurality of further nodes:
using a fitness calculation module to perform an act of calculating a fitness metric value for the further node, the fitness metric value representing the further node's ability to transfer and process messages within the overlay network, the fitness metric value based at least in part on the fitness information for the further node; and
using a routing table manager to perform an act of inserting the further node into the computer system's routing table;
at the first node, performing an act of determining in accordance with a routing policy that the number of nodes in the computer system's routing table exceeds a specified number;
an act of dividing the first node's routing table into a plurality of ranges, each range corresponding to a portion of the overlay network;
an act of assigning each node in the first node's routing table to one of the plurality of ranges based on the location of the node in the overlay network;
an act of reducing the size of the first node's routing table to the specified number of nodes in accordance with the routing policy, by performing the following:
an act of identifying in the first node's routing table a range that is as large or larger than any other range in the routing table in terms of the number of nodes included in the identified range; and
an act of removing the node that has the lowest fitness value and as such is least fit to transfer and process messages, among the nodes in the identified range, from the first node's routing table.

23. At a computer system which represents a node in an overlay network having a doubly linked ring topology, the overlay network also including a plurality of other computer systems representing other nodes, a computer program product comprised of computer-readable physical storage media, which, when implemented on a computer system of one of the nodes performs a method for maintaining routing tables at each of the computer systems of the nodes of the overlay network so that routing information from one node to another can be more efficiently determined using the routing tables, the method comprising:

at the computing system of one or more nodes of the overlay network, performing the following:
at a first node of the overlay network, performing an act of receiving a message from another node in the doubly linked ring topology, the message including node information for a plurality of further nodes in the other node's routing table, the received node information indicating routing table size for each further node in the other node's routing table;

at the first node, performing an act of locking the computer system's routing table to prevent any routing determinations subsequent to receiving the message, each node in the computer system's routing table being a node to which the computer system of the first node can send messages that are then forwarded by that node for delivery to a destination node within the doubly linked ring topology, each of the plurality of nodes in the computer system's routing table stored along with an indication of a corresponding routing table size of the node;

at the first node, performing an act of integrating the plurality of further nodes into the computer system's routing table;

at the first node, performing an act of determining that the number of nodes in the computer system's routing table exceeds a specified number based on a routing table policy;

at the first node, performing an act of dividing the routing table into a plurality of ranges, each range corresponding to a portion of the doubly linked ring topology;

at the first node, performing an act of assigning each node in the routing table to one of the plurality of ranges based on the location of the node in the doubly linked ring topology;

repeating the following acts at the first node until the number of nodes in the computer system's routing table no longer exceeds the specified number:

an act of identifying in the first node's routing table a range that is as large or larger than any other range in the routing table in terms of the number of nodes included in the identified range;

an act of identifying a node within the identified range that has the smallest indicated routing table size; and an act of removing the identified node from the computer system's routing table; and at the first node, performing an act of unlocking the computer system's routing table so that the computer system's routing table can again be used in routing determinations subsequent to the number of nodes in the computer system's routing table no longer exceeding the specified number.

* * * * *